J. V. WORTHINGTON.
MANUFACTURE OF PNEUMATIC TIRE CASINGS.
APPLICATION FILED JAN. 11, 1922.

1,419,907.

Patented June 13, 1922.
3 SHEETS—SHEET 1.

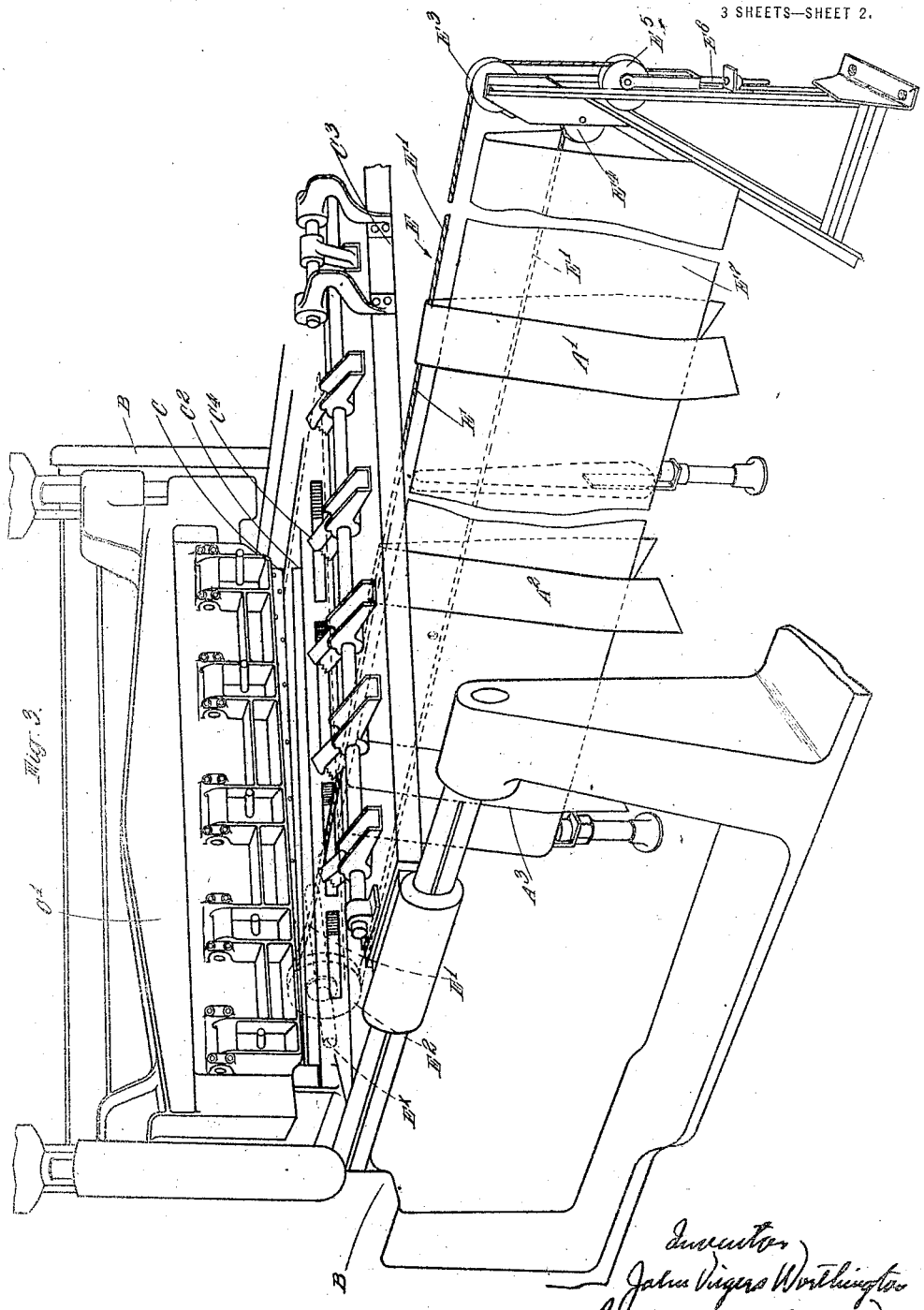

J. V. WORTHINGTON.
MANUFACTURE OF PNEUMATIC TIRE CASINGS.
APPLICATION FILED JAN. 11, 1922.
1,419,907.
Patented June 13, 1922.
3 SHEETS—SHEET 3.
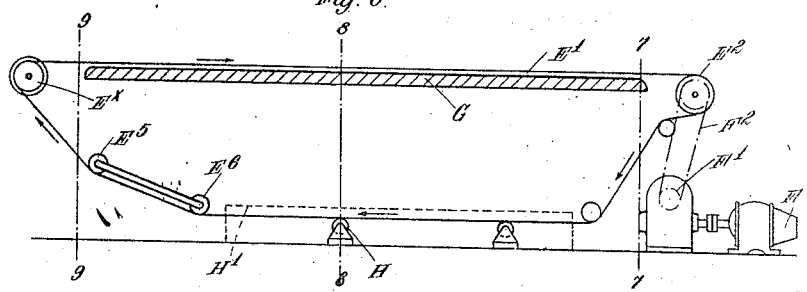
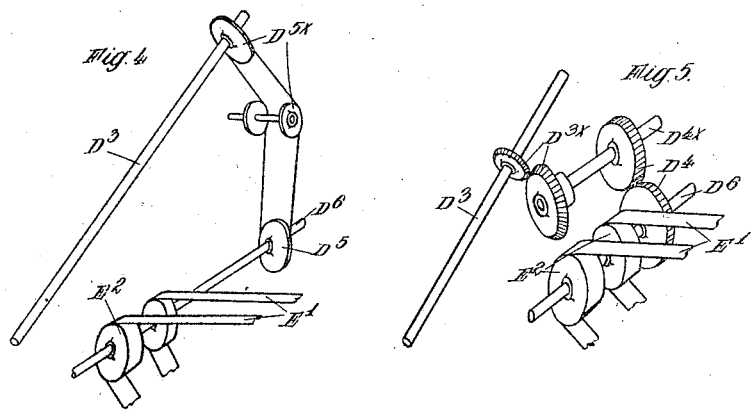
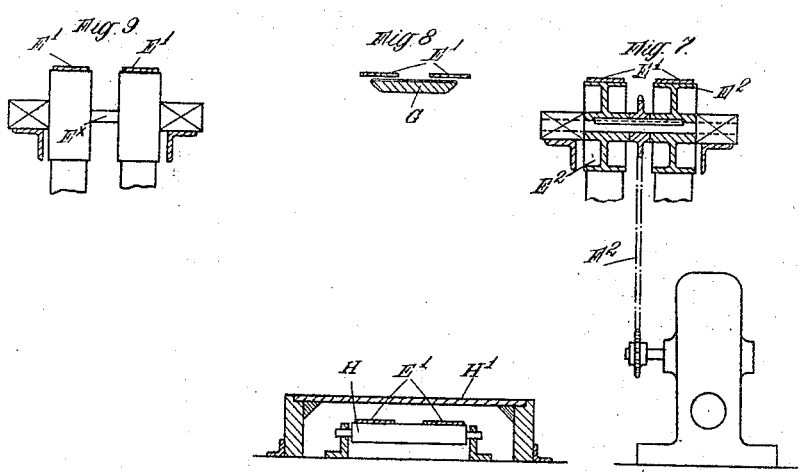

UNITED STATES PATENT OFFICE.

JOHN V. WORTHINGTON, OF AXMINSTER, ENGLAND, ASSIGNOR TO THE DUNLOP RUBBER COMPANY, LIMITED, OF REGENT'S PARK, LONDON, ENGLAND, A BRITISH COMPANY.

MANUFACTURE OF PNEUMATIC TIRE CASINGS.

1,419,907.  Specification of Letters Patent.  Patented June 13, 1922.

Application filed January 11, 1922. Serial No. 528,523.

*To all whom it may concern:*

Be it known that I, JOHN VIGERS WORTHINGTON, a subject of the King of Great Britain, residing at Weycroft Manor, Axminster, in the county of Devon, England, have invented certain new and useful Improvements in or Relating to Manufacture of Pneumatic Tire Casings, of which the following is a specification.

This invention relates to the manufacture of pneumatic tire covers or casings and has particular reference to the cutting of the canvas or cord fabric into strips or plies and to the batching up of such strips or plies ready for use in the building up of the tire casing. Usually the cut strips or plies as they fall from the cutting knife are batched up into canvas books, this operation being effected in close proximity to the cutting machine. The batched up strips or plies are subsequently removed from the canvas books and are rebatched onto circular spools or boxes ready for use in the casemaking or tire-building machine. It is the chief object of the present invention to avoid the double handling or batching of the strip or plies and thus effect a saving of labour and time in handling the strips or plies after leaving the cutting knife.

According to this invention the strips or plies as they leave the cutting knife are carried away by suitable conveying mechanism to one or more positions where the operators remove the strips from the conveyor and batch them up on to spools, rolls or the like ready for the next step or operation in the manufacture of the tire casing. The conveyor is of narrow formation compared with the length of the strips or plies and it is so combined with or arranged relatively to the cutting machine (which may be of any known or suitable type) that the cut strips or plies are successively supplied to or successively fall on the said narrow conveyor which supports the middle part of each strip or ply so that its ends hang or are suspended on each side of the conveyor whilst the latter carries the strips or plies from the cutting machine to the position or positions where the strip can be conveniently batched up on to the spools, rolls or the like ready for use in the case making machine. In the case of a vertical bias cutting machine having an inclined cutter or knife, the conveyor mechanism may comprise two conveyors, one which is inclined to agree with the inclination of the knife and which receives each cut strip lengthwise and transfers it to the other and main conveyor which may be so constructed that the strip is suspended or hung thereon and conveyed in this manner to the batching means. The inclined or initial conveyor may comprise a number of endless belts arranged to receive the full length of each strip and feed or transfer the strip to the main conveyor which may be in the form of an endless cable or narrow band which supports the strip in such manner that its ends which hang down as the strip is conveyed along may be separated by an interposed guiding member. In the case of a cutting machine having a horizontal knife the inclined conveyor need not be used, as the main conveyor may be so constructed and arranged as to receive each cut strip as it leaves the knife so that the strip is suspended or hung on the conveyor and transferred to the batching means.

Instead of using a single cable or band as the main conveyor a plurality of closely arranged cables or bands may be used, so that each strip or ply is supported on the said cables or bands at its middle part with its ends suspended and separated.

In order that the said invention may be clearly understood and readily carried into effect the same will now be described more fully with reference to the accompanying drawings, in which:—

Figure 3 is a perspective view showing the invention applied to a horizontal cutting machine.

Figures 4 and 5 are fragmentary perspective views showing modifications as applied to the vertical bias cutting machine.

Figure 6 is a diagrammatic side view of a modified construction of conveyor which may be used in conjunction with a vertical bias cutting machine or a horizontal cutting machine.

Figures 1, 2:
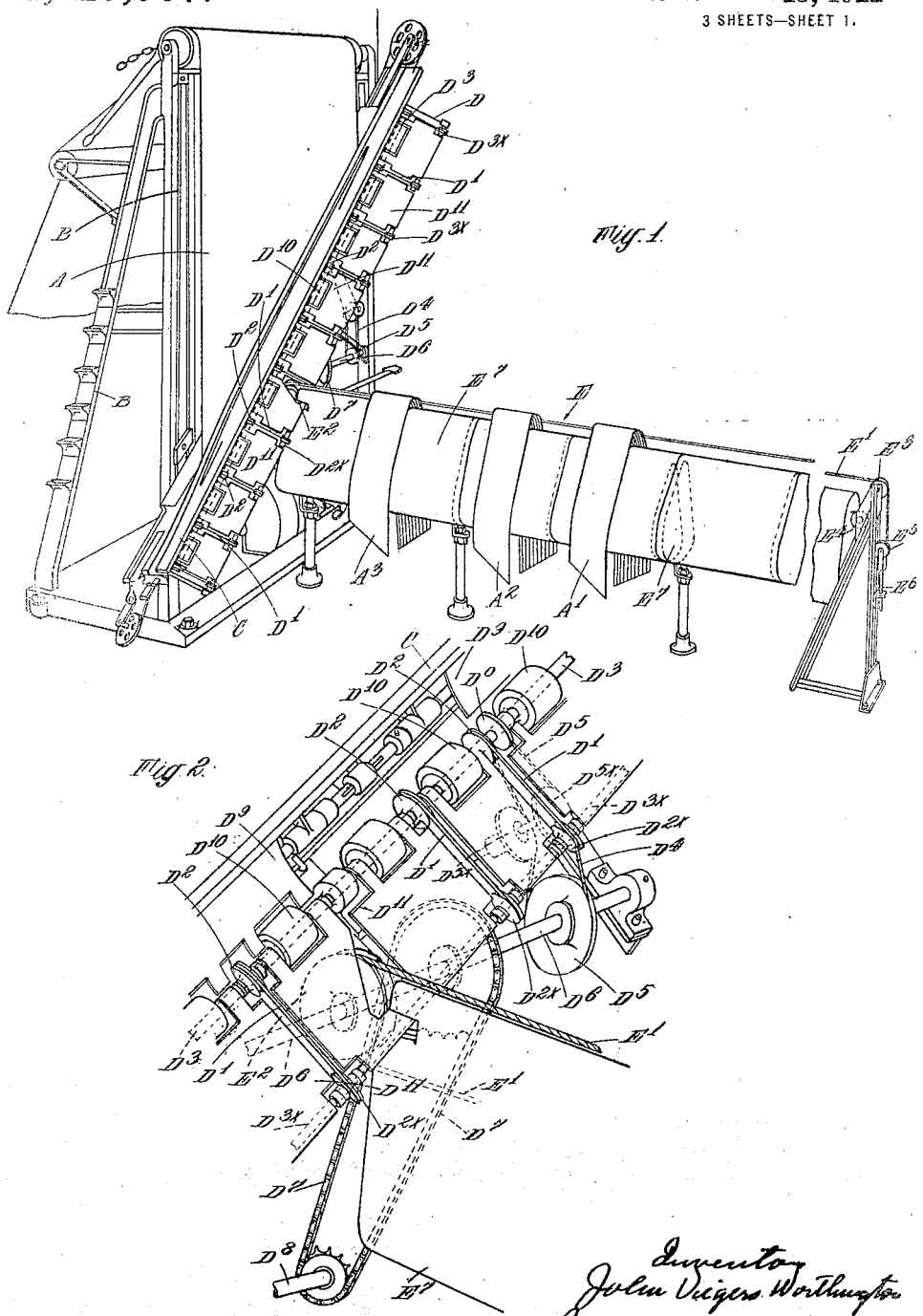
Figure 1 is a perspective view showing one embodiment of the invention applied to a vertical bias cutting machine.
Figure 2 is an enlarged perspective view of a portion of a multiple belt or "feeder" conveyor showing its position relatively to the main conveyor of which only a small part is shown.

Figures 7, 8 and 9 are enlarged cross sectional views taken respectively on the lines 7—7, 8—8 and 9—9 of Figure 6.

A is the canvas or cord sheeting which as shown in Figure 1 is passed over rollers supported in the cutting machine B and directed vertically downwards towards the inclined knife or cutter C which is suitably operated to cut the sheeting A into strips $A'$, $A^2$, $A^3$.

In this example the strips as they are successively cut fall freely from the knife on to the feeder conveyor D which as hereinafter described transfers each strip on to the main conveyor E. The feeder conveyor D is inclined to agree with the inclination of the knife B and it comprises a number of short endless belts $D'$ passing around two sets of grooved pulleys $D^2$, $D^{2x}$ mounted on two shafts $D^3$, $D^{3x}$ which are inclined to agree with the inclination of the knife C. The pulleys $D^2$ nearer the knife are keyed on the common shaft $D^3$ which may be driven by a belt $D^4$ passing around a driving pulley $D^0$, two idler pulleys $D^{5x}$, $D^{5x}$ and a driven pulley $D^{5x}$ secured to the shaft $D^3$; the driving pulley $D^5$ is keyed on a horizontal shaft $D^6$ which as shown is driven by a chain $D^7$ from the shaft $D^8$ of the cutting machine; the other set of pulleys $D^{2x}$ rotate freely on a stationary shaft $D^{3x}$. The belts $D^1$ when passing above the pulleys receive each cut strip which is deflected or guided as it leaves the knife on to the belts $D^1$ by means of plates $D^9$, and rotating stripping rollers $D^{10}$ are provided on the shaft $D^3$ for assisting or effecting the movement of the strip from the deflecting plates $D^9$ on to the belts $D^1$; plates $D^{11}$ are disposed below the level of and between the belts $D^1$ to afford support for the whole length of strip and prevent sagging thereof between the points of support afforded by the belts $D^1$. Instead of employing belts in the form of cables, band-like belts passing around suitable pulleys may be used. The successively cut strips are carried or moved forward in succession by the multiple belts $D^1$ towards the main conveyor E which may comprise a cable or narrow belt $E^1$ travelling horizontally around a driving pulley $E^2$ on the aforesaid chain driven horizontal shaft $D^6$ and around a series of suitably supported idler pulleys $E^3$, $E^4$, $E^5$ of which the pulley $E^5$ may be adjustable by a nut or screw device $E^6$ to vary the tension on the cable or belt $E^1$. The cable or belt $E^1$ when travelling or passing above the pulleys $E^2$, $E^3$ receives the strips from the multiple belt feeder and it is arranged to pass through an opening in the plate $D^{11}$ of the feeder conveyor so that each strip is delivered from the latter conveyor on to the cable $E^1$ at or near a point midway between the ends of the strip. So soon as the strip leaves and is no longer supported by the multiple belt feeder or conveyor D it is suspended on the said cable $E^1$ with its ends or overhanging portions separated by an interposed guide $E^7$ which permits of the strips suspended on the belt being carried along with a minimum of resistance. The guide $E^7$ as shown is of inverted V-shape and the strips hang from the cable $E^1$ in inverted V-form whilst being carried to the point where the cable passes around the idler pulleys $E^3$, $E^4$, $E^5$; the strips may be removed at a number of batching positions along the length of the main conveyor E. Instead of using a cable conveyor $E^1$ and a V-shaped guide $E^7$ as aforesaid we may employ a take-away belt or band or bands which may be of such width that the strips can be supported thereon at their middle parts with their ends hanging or suspended and well separated as the strips are carried away by the moving band or belt. Examples of such conveyors are illustrated in Figures 4 to 9 wherein the conveyor comprises two bands $E^1$, $E^1$ spaced apart so as to form a gap between them which facilitates the picking up or removal of the strips or plies $A^1$, etc., at the position where the batching up of the strips is effected. As shown in Figure 4 the two bands $E^1$, $E^1$ are driven by pulleys $E^2$, $E^2$ on the shaft $D^6$ which by means of the belt $D^4$ passing around the driving pulley $D^5$ on the shaft $D^6$ the idler pulleys $D^{5x}$ and the pulley $D^0$ drives the inclined shaft $D^3$ as described in the foregoing example. Alternative driving means are shown in Figure 5 wherein the shaft $D^6$ carrying the driving pulleys $E^2$, $E^2$ of the conveyor bands $E^1$, $E^1$ drives a shaft $D^{4x}$ by spur gearing $D^4$ drives the inclined shaft $D^3$ through bevel gearing $D^{3x}$.

The example illustrated in Figure 3 shows the invention applied to a horizontal cutting machine B which is of usual construction comprising the moving knife C, the knife beam $C'$, a stationary knife $C^2$, the feed carriage $C^3$ and the fingers $C^4$ which pull the canvas or fabric between the knives C, $C^2$. In this example the feeder or multiple belt conveyor is dispensed with and the cable conveyor E which is similar to the main conveyor described in the foregoing example is increased in length so as to pass under the feed carriage to the rear of the knives where the cable $E^1$ of the conveyor passes around a driving pulley $E^2$ mounted on a driving shaft $E^x$ which derives its rotation from a suitable moving part of the machine, the cable $E^1$ also passing around a series of idler pulleys $E^3$, $E^4$, $E^5$ as hereinbefore described in connection with the previous example. The plies or strips successively cut from the cord or canvas sheeting by the knives C, $C^2$ are free to fall directly on to the cable $E^1$ which carries them in succession to the batching means disposed at or adjacent to the aforesaid idler pulleys E³, E⁴, E⁵.

Figure 6 shows diagrammatically a modified narrow conveyor in which the conveyor is operated from a source independent of the means for operating the cutting machine. This modified conveyor may be used in conjunction with a vertical bias cutting machine or horizontal cutting machine; in the example shown the driving means may comprise an electric motor F which through reduction gearing F¹ and chain gearing F² rotates two driving pulleys E², E² for imparting movement to the two spaced conveyor bands E¹, E¹ which pass around suitable idler pulleys on the shaft Eˣ adjacent to the position where the strips or plies leave the cutting machine, said conveyor bands also passing around other pulleys as diagrammatically illustrated of which the pulley E⁵ may be adjustable by means of a weight or screw device on a centre E⁶ for obtaining the desired tension on the bands E¹, E¹. A support G is provided upon which the bands carrying the strips or plies A¹, etc., rest when passing above the pulleys E² and the pulleys on the shaft D⁶. The return portions of the bands are preferably arranged to travel over rollers H and are covered by a casing H¹ as shown in Figure 8.

What I claim and desire to secure by Letters Patent of the United States is:—

1. The combination in a machine of the class described, of means for cutting a sheet of material into strips, and a narrow conveyor so disposed relative to said cutting means as to receive the cut strips at substantially their middle parts, said strips being uniformly spaced for delivery at points along the length of the conveyor.

2. The combination in a machine of the class described, of means for cutting a sheet of material into strips, a narrow conveyor disposed relative to said cutting means to receive the cut strips at substantially their middle parts, the end portions of said cut strips being freely suspended and separated for delivery at points along the length of the conveyor.

3. In a machine of the class described having in combination a cutter, an endless conveyor positioned substantially at right angles to said cutter, means on said conveyor for receiving the cut strips, said strips being spaced on said conveyor so as to permit ready removal therefrom.

4. The combination with a machine for cutting fabric material into strips for use in the manufacture of pneumatic tire covers, of a feeding mechanism adapted to receive and support each cut strip lengthwise, and a narrow conveyor on to which each strip is supplied by the feeding mechanism.

5. The combination in a machine of the class described of feeding mechanism comprising a number of belts which carry the plies as they leave the cutting machine, and a narrow conveyor on which the plies are supported at their middle parts and carried along with their end portions suspended.

6. The combination with a cutting machine of the vertical bias type for cutting fabric material into strips for use in the manufacture of pneumatic tire covers, of feeding mechanism comprising a number of belts supported at an inclination to agree with the inclination of the cutting knife, and a narrow conveyor disposed under and between the ends of the feeding mechanism so as to receive the strips from the feeding mechanism and support the same at their middle parts with their ends suspended.

7. The combination with a fabric cutting machine of the vertical bias type having an inclined cutting knife, of feeding mechanism comprising shafts in parallelism, endless belts passing around pulleys on the two shafts, means for driving one of said shafts from a suitable moving part of the cutting machine, and an endless conveyor operated by the means which operate the aforesaid inclined shafts.

8. The combination with a fabric cutting machine having inclined knife, of a pair of shafts disposed parallel with said knife, stripping rollers on one of said shafts, pulleys on both said shafts, endless belts passing around said pulleys, supporting plates between said endless belts, a main driving shaft, means for operatively connecting one of said shafts to the main driving shaft, a pulley on said main driving shaft, a support or standard carrying a pulley, an endless conveyor belt passing around the pulley on the main driving shaft, and the pulley on said support whereby the strips as they leave the cutting machine are supplied by the endless belts on the two inclined shafts to the endless conveyor belt on which the strips are supported at their middle parts with their end portions freely suspended.

9. A fabric cutting machine having in combination a pulley journalled in said machine, a cutter, a support remote from said cutter, provided with a pulley in alignment with said first mentioned pulley, an endless conveyor engaging said pulleys and disposed to receive the strips from said cutter, and means connected to one of said pulleys for driving said conveyor.

10. A fabric cutting machine having in combination a pulley journalled in said machine, a cutter, a support remote from said cutter provided with a pulley in alignment with said first mentioned pulley, an endless conveyor engaging said pulleys and disposed to receive the strips from said cutter, means connected to one of said pulleys for driving said conveyor, and means carried by said support for adjusting the tension on said conveyor.

11. A fabric cutting machine having in combination a pulley journalled in said machine, a cutter, a support remote from said cutter provided with a pulley in alignment with said first mentioned pulley, an endless conveyor engaging said pulleys and disposed to receive the strips from said cutter, means connected to one of said pulleys for driving said conveyor, and means comprising an adjustable pulley engaged by said conveyor for adjusting the tension of the latter.

12. A fabric cutting machine having in combination a pulley journalled in said machine, a cutter, a support remote from said cutter provided with a pulley in alignment with said first mentioned pulley, an endless conveyor engaging said pulleys and disposed to receive the strips from said cutter, means associated with said conveyor for maintaining the suspended end portions of said strips at a suitable distance apart, and means connected to one of said pulleys for driving said conveyor.

13. A fabric cutting machine having in combination a pulley journalled in said machine, a cutter, a support remote from said cutter provided with a pulley in alignment with said first mentioned pulley, an endless conveyor engaging said pulleys and disposed to receive the strips from said cutter, means connected to one of said pulleys for driving said conveyor, and a guide associated with said conveyor to separate the ends of the cut strips.

J. V. WORTHINGTON.